United States Patent
Kimura et al.

(10) Patent No.: US 7,664,005 B2
(45) Date of Patent: Feb. 16, 2010

(54) OPTICAL PICKUP APPARATUS

(75) Inventors: Shigeharu Kimura, Yokohama (JP); Takeshi Shimano, Yokohama (JP)

(73) Assignee: Hitachi Media Electronics Co., Ltd. (JP)

(*) Notice: Subject to any disclaimer, the term of this patent is extended or adjusted under 35 U.S.C. 154(b) by 536 days.

(21) Appl. No.: 11/704,953

(22) Filed: Feb. 12, 2007

(65) Prior Publication Data

US 2008/0127238 A1 May 29, 2008

(30) Foreign Application Priority Data

Nov. 27, 2006 (JP) .............................. 2006-319080

(51) Int. Cl.
*G11B 7/00* (2006.01)
(52) U.S. Cl. .............................. 369/112.29; 369/112.23
(58) Field of Classification Search ........................ None
See application file for complete search history.

(56) References Cited

U.S. PATENT DOCUMENTS 5,790,501 A * 8/1998 Kase et al. ............. 369/110.04

FOREIGN PATENT DOCUMENTS

| JP | 2002-367211 | 12/2002 |
| JP | 2005-302084 | 10/2005 |

OTHER PUBLICATIONS

Noriyoshi Shida, et al.; Superlarge-Capacity Optical Disk with Multilayer Structure Fabricated Using a Photopolymer Sheet; Jpn. J. Appl. Phys.; Part 1, No. 2B, Feb. 2003; vol. 42; pp. 778-783.

* cited by examiner

*Primary Examiner*—Paul Huber
(74) *Attorney, Agent, or Firm*—Antonelli, Terry, Stout & Kraus, LLP.

(57) ABSTRACT

The adverse influence of reflected light from adjacent layers as stray light on a control signal or data signal is reduced when tracking a multilayered optical disc using differential push-pull method. The reflected light from the optical disc including stray light from an adjacent layer is once condensed with a condenser lens having little aberration and is then reflected by a reflecting mirror having a partial reflecting region. The resultant reflected light, which has the influence of stray light reduced, passes through a polarization beam splitter and becomes incident on a four-quadrant detector (for main beam) and a split detector (for sub beam) via a condenser lens having astigmatic aberration.

18 Claims, 14 Drawing Sheets

OPTICAL PICKUP APPARATUS

CLAIM OF PRIORITY

The present application claims priority from Japanese application JP 2006-319080 filed on Nov. 27, 2006, the contents of which are hereby incorporated by reference into this application.

BACKGROUND OF THE INVENTION

1. Field of the Invention

The present invention relates to an optical pickup apparatus and particularly to a reading optical system of an optical pickup apparatus.

2. Background Art

The capacity of a single layer in an optical disc largely depends on the wavelength of the semiconductor laser used and the numerical aperture (NA) of the objective lens. The shorter the wavelength of the semiconductor laser, or the larger the NA, the greater the recording density can be made, with a resultant increase in the capacity of each layer. Most of the currently commercially available optical disc drives are DVD (Digital Versatile Disc) drives that employ the color of red with wavelengths in the vicinity of 650 nm and an objective lens having an NA of 0.6. Shipping has started of optical drives that exceed the recording density of DVDs, using a light source consisting of a semiconductor laser of blue-violet light with wavelengths in the vicinity of 405 nm and an objective lens with an NA of 0.85. Difficulty is expected for the development of a semiconductor laser light source having wavelengths shorter than those of such blue violet for future recording density improvement, because the wavelengths would be in the UV range. Furthermore, since the limit of NA of an objective lens in air is 1, further improvements in recording density by means of the objective lens are also becoming difficult to achieve.

Under such circumstances, use of multiple layers is suggested as a means of increasing the capacity of an individual optical disc. For example, Non-patent Document 1 discloses a ROM (Read Only Memory) having four layers. When a multilayer optical disc is irradiated with laser light, crosstalk between the layers becomes an issue because of the simultaneous irradiation of a plurality of layers. In order to address this problem, the interlayer distance may be increased. In this way, crosstalk can be reduced because laser light is focused and layers other than a target layer are displaced from the position where the laser light is focused.

However, such increase in the interlayer distance gives rise to the problem of spherical aberration. Between the recording layers, polycarbonate is used, which has a refractive index different from that of air and thus poses a cause for spherical aberration. The objective lens is designed such that its spherical aberration is minimized with respect to a particular layer. As a result, spherical aberration is caused when the focus of laser light is shifted to any of layers other than the aberration-minimized layer. Such aberration can be normally corrected by placing an expander lens system consisting of two lenses, or a liquid crystal element in front of an objective lens, and varying the distance between the two lenses or the phase of the liquid crystal element. However, it is impossible to correct large spherical aberration, given the possible range of compensation of the liquid crystal element or the need to realize a lens transfer mechanism within the small optical disc drive apparatus. Thus, it is difficult to achieve a sufficient increase in the interlayer distance in a multilayer optical disc for actual optical drive units. Consequently, some interlayer crosstalk inevitably remains in a multilayered optical disc.

In order to reduce the aforementioned crosstalk, in Patent Document 1, a minute mirror is disposed on the optical axis so as to obtain only the reflected light of interest and reduce crosstalk. This takes advantage of the fact that the position along the optical axis where the reflected light from a multilayer optical disc is focused by lenses differs between a target layer and an adjacent layer. However, because the reflected light from the optical disc is bent laterally with respect to the optical axis, the optical head inevitably needs to be increased in size. Patent Document 2 proposes a method for removing reflected light from an adjacent layer by means of a critical angle prism. In this method, which takes advantage of the fact that the reflected light from the relevant layer is converted into collimated parallel light but the reflected light from the adjacent layer becomes a diverging ray or a converging ray, rays that have assumed more than a certain angle with respect to the optical axis are removed by a critical angle prism. In this method, too, the optical head needs to be increased in size due to the use of two critical angle prisms.

Patent Document 1: JP Patent Publication (Kokai) No. 2005-302084 A

Patent Document 2: JP Patent Publication (Kokai) No. 2002-367211 A

Non-Patent Document 1: Jpn. J. Appl. Phys. Vol. 42 (2003) pp. 778-783

SUMMARY OF THE INVENTION

With reference to FIG. 3, cross talk caused by a multilayer optical disc in a detection optical system in an optical pickup apparatus is described. A tracking error signal is presumably detected by the DPP (Differential Push-Pull) method. In the DPP method, the optical disc is irradiated with one main beam and two sub beams, which are obtained by dividing laser light with a diffraction grating. FIG. 3 shows only a main beam 80. For simplicity, an optical disc 501 is a double-layer disc, including information recording layers 511 and 512. A minimum beam spot of the main beam from the objective lens 401 is located on the information recording layer 511, as indicated by the main beam 80, in an attempt to read the information in the information recording layer 511. Tracking guide grooves are formed on the information recording layer 511, as shown in FIG. 4. The main beam is focused on these grooves as an optical spot 94, while the sub beams are focused at positions shifted by a half of the track pitch as irradiation spots 95 and 96. The focal position of the irradiation light is aligned on the recording layer 511, so that its reflected light returns to the objective lens 401 of FIG. 3 via the same optical path as that of the incident light in the opposite direction. The reflected light then passes through a detection lens 402 and becomes incident on a photodetector 51 as an optical beam 81. The detection lens 402 has astigmatic aberration, and the photodetector 51 is disposed at the position of the circle of least confusion.

FIG. 5 shows the configuration of a photodetector and how the reflected light from the disc becomes incident thereon. A four-quadrant detector 541 at the center is used to detect the main beam, which is shone on the detector 541 as a spot 811. Reflected light caused by the sub beam is incident on split detectors 542 and 543 as optical spots 812 and 813, respectively. Signals A, B, C, and D are obtained from the four-quadrant detector 541; signals E and F are obtained from the split detector 542; and signals G and H are obtained from the split detector 543. A tracking error signal TR is denoted by $TR=(A+B)-(C+D)-k\{(E-F)+(G-H)\}$, where k is a constant determined by the intensity ratio of the main beam to the sub beam, for example. Normally, the main beam is set to have an intensity at least ten times that of the sub beams. Further, when the focus error signal is AF and a data signal is RF, AF=A+C−(B+D) and RF=A+C+B+D. TR and AF signals are used for controlling the laser light irradiation position.

The multilayer disc is designed such that when it is irradiated with laser light, the individual layers will produce substantially identical amounts of reflected light. Namely, layers closer to the objective lens have greater transmittance so that the layers farther from the objective lens can be irradiated with laser light. Under such conditions, when the laser light is focused at the information target layer 511, as shown in FIG. 3, some of the laser light passes through the layer 511 as an optical beam 82 and is then reflected by an adjacent layer 512, resulting in a reflected optical beam 83, which is stray light. The reflected optical beam 83 returns to the objective lens 401, becomes incident on the detection lens 402, and then condensed once in front of the photodetector 51, before it becomes incident on the photodetector 51 as it spreads, as shown by an optical beam 84. The optical beam 84 then produces a spread optical spot 841 on the photodetector surface, as shown in FIG. 5, such that the photodetectors 541, 542, and 543 are covered thereby. Thus, the optical spot interferes with beams 811, 812, and 813. Such interference is influenced by a change in the phase of the optical spot 841 due to the variation in interlayer distance. Such variations in the state of interference then causes variations in the RF signal intensity, which indicates the total light amount of the beam 811. Such variations in turn cause deterioration in the RF signal jitter, thereby adversely affecting the error rate during data reading. Further, since the intensity of the sub beams, which are produced by division using the diffraction grating, is designed to be small and is approximately the same as the power density of the reflected light of the main beam from the adjacent layer. For this reason, the effect of interference becomes pronounced. Such interference is also influenced by the inclination of the optical disc or the interlayer distance, for example, such that the distribution of light amount of the optical spot 812 or 813 becomes varied in a rotating disc in which the interlayer distance is not uniform. As a result, the differential signal portion (E−F)+(G−H) of the TR signal is affected, resulting in a loss of balance in the tracking signal, which could lead to problems such as a tracking error. Similarly, when the adjacent layer 512 is closer to the objective lens with respect to the target layer 511, reflected light is produced by the adjacent layer and the similar problem of interference occurs.

It is therefore an object of the invention to reduce cross talk in a data signal or tracking signal from a multilayer optical disc without an associated increase in the size of the optical pickup apparatus.

In order to achieve the aforementioned object, a method is employed to reduce the influence of reflection of the main beam off the adjacent layer. In the optical system of FIG. 3, the condenser lens 402 is provided with astigmatic aberration, and the photodetector is disposed at a position on the optical axis where the convergent beam has the circle of least confusion. In this case, because the circle of least confusion is larger than a focused spot having no aberration, the photodetector disposed at the position of the circle of least confusion inevitably needs to be made wide. In this case, as described with reference to FIG. 5, the reflected light 841 from the adjacent layer becomes incident on the detectors 542 and 543 as stray light. In order to reduce such stray light, the reflected light from the optical disc, including stray light from adjacent light, is once condensed with a condenser lens having no astigmatic aberration, namely, only a small aberration, and a reflecting plate having a partially reflecting region is disposed at the light condensed position. Because the condensing is conducted with a lens with only a small aberration, the spot size at the position of focus becomes small. On the other hand, the reflected light from the adjacent layer is wide regardless of the presence or absence of astigmatic aberration, so that there is not much change in the power density distribution.

FIG. 6 shows a state in which the reflected light from an optical disc is narrowed with a lens having no aberration. Numeral 821 designates a condensed spot of the reflected light of the main beam from a relevant layer; numerals 822 and 823 designate condensed spots of the reflected light of the sub beams. Because the lens does not have aberration, the produced spots are smaller than the circle of least confusion shown in FIG. 5. The reflected light 842 from the adjacent layer is greatly enlarged and is not much different from the case shown in FIG. 5. A reflecting mirror having a partially reflecting region is disposed at the position of focus. In FIG. 6, numeral 601 designates a square-shaped reflecting portion that reflects the main beam. Numerals 602 and 603 similarly designate reflecting portions, each reflecting the sub beam. The size of the reflecting portions may be smaller than the photodetector 542 or 543 disposed at the circle of least confusion (FIG. 5) because the spot size of each of the beams is small. When the light reflected by the reflecting portions of FIG. 6 is to be detected by the photodetector shown in FIG. 5, the reflected light from the adjacent layer that is incident on each detector decreases because the area of the reflecting portions 601 to 603 is small. On the other hand, the reflected light 821, 822 and 823 from the relevant layer does not greatly decrease, so that the effect of interference of both on the detector decreases.

In the present invention, the influence of the reflected light from the adjacent layer can be reduced by detecting the reflected light from the relevant layer and that from the adjacent layer after reflecting them with a reflecting mirror having partial reflecting regions. Similar effects can be obtained with the use of a pinhole; however, the pinhole is of transmitting nature, it would require an optical system behind the pinhole, resulting in an increase in the size of the apparatus. In accordance with the invention, a reflecting plate having partial reflecting regions is used, so that the existing optical elements can be shared and the size of the apparatus can be reduced.

In accordance with the invention, the amount of reflected light due to the adjacent layer that is incident on the photodetector for obtaining a tracking error signal can be reduced, so that the variation of the tracking error signal due to interference can be reduced. Thus, when reading from or writing into an optical disc, the optical spot can be prevented from being displaced off track. At the same time, the influence of the reflected light from the adjacent layer on the photodetector can be reduced, so that jitter in the data signal can be reduced and the reliability of data that is read can be improved.

DESCRIPTION OF THE PREFERRED EMBODIMENTS

In the following, preferred embodiments of the optical disc drive apparatus according to the invention will be described with reference to the drawings.

Embodiment 1

Figure 1:
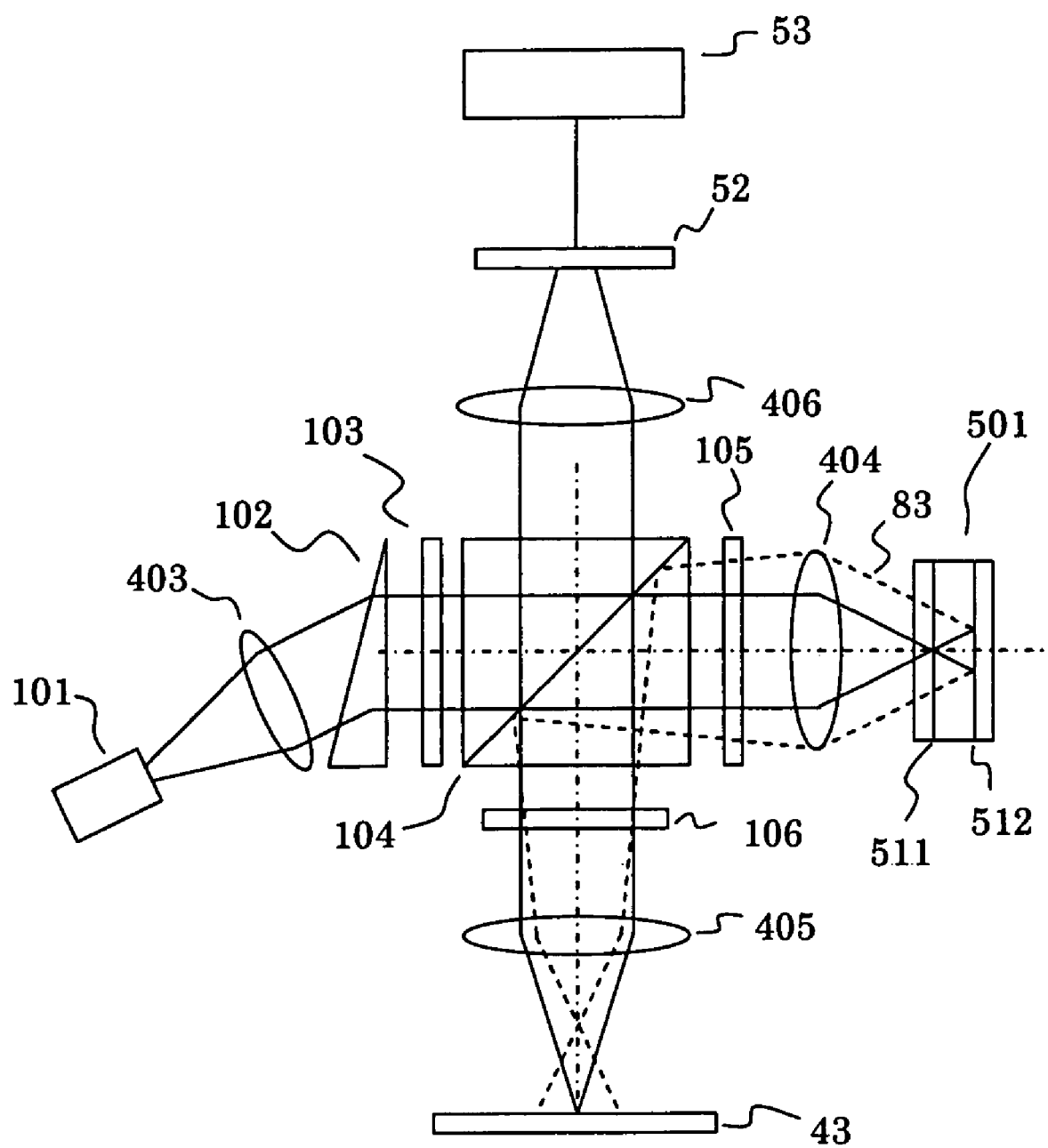
FIG. 1 shows an example of an optical system in the optical pickup apparatus according to the invention.

FIG. 1 shows an optical pickup portion of an optical disc drive apparatus. The laser light emitted by the semiconductor laser 101 is converted by a collimating lens 403 and a triangular prism 102 into a circularly collimated optical beam. The collimated beam is then divided by a diffraction grating 103 into three beams, one main beam and two sub beams. While the direction of propagation of the main beam is the same as that of the incident beam, the sub-beams constitute outgoing light having certain inclination with respect to the optical axis on either side. Normally, the difference in the optical powers of the main beam and sub beams is set to be 10 times or more. The three beams pass through a polarization beam splitter 104 and is converted by a λ/4 plate 105 into circularly polarized light, which is then focused by an objective lens 404 onto a rotating multilayer disc 501 rotated by a rotating mechanism. While in the illustrated example the disc is a double-layer disc, this is merely an example and the invention can be applied to multilayer discs having three or more layers. The target layer (relevant layer) is indicated at 511, and the minimum spot of laser light is located on the target layer 511. Reflected light 83 is also produced by an adjacent layer 512, leading to stray light, which is a cause for cross talk.

Figure 5:
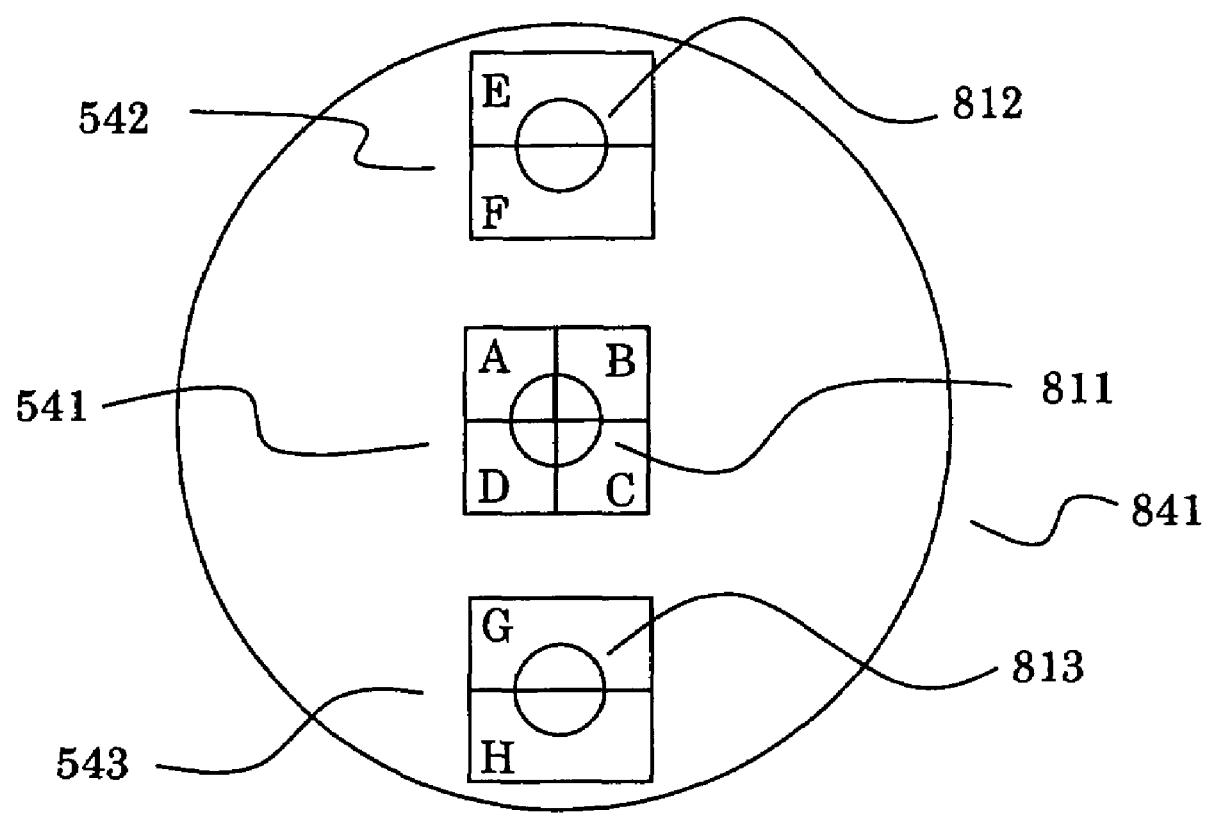
FIG. 5 shows the configuration of a photodetector, and the position and extent of an optical spot of reflected light from the optical disc.
Figure 6:
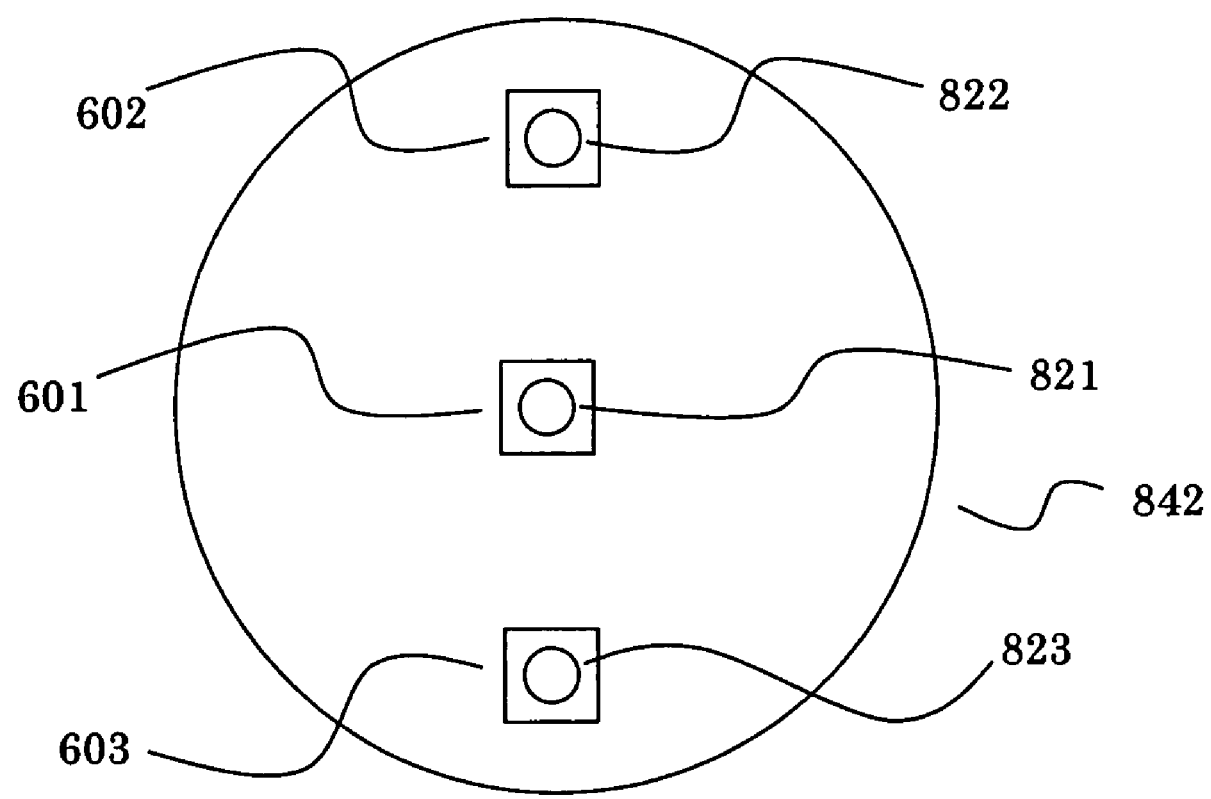
FIG. 6 shows a state in which reflected light from the optical disc is focused with a condenser lens having no aberration, and a reflecting plate having partial reflecting regions.
Figure 7:
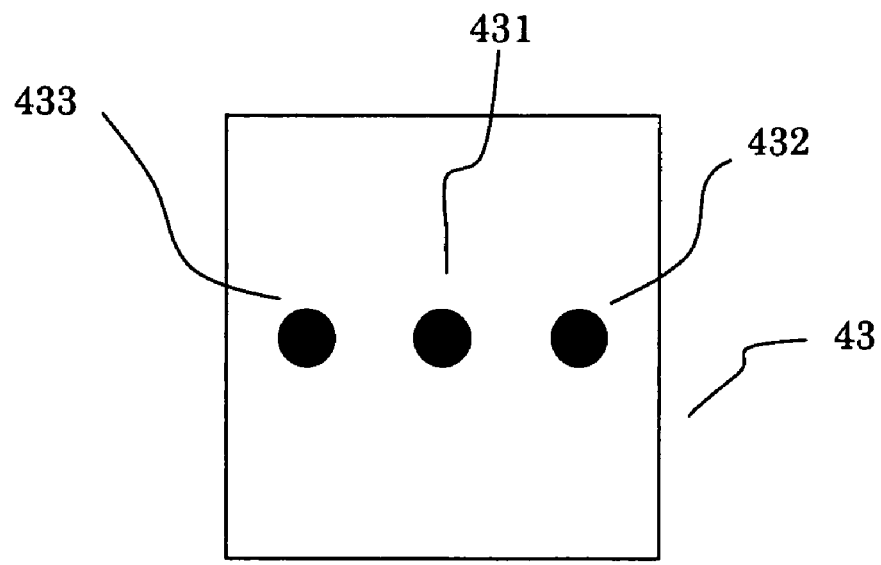
FIG. 7 shows the configuration of a reflecting plate having partial reflecting regions of the same size.

The reflected light from the multilayer disc, including stray light, returns via the objective lens 404 and is converted by the λ/4 plate 105 into linearly polarized light in a direction perpendicular to the direction of the original polarization. As a result, the linearly polarized light is reflected by the polarization beam splitter 104 and directed to a λ/4 plate 106, by which it is converted into circularly polarized light. Thereafter, the light is focused by the condenser lens 405 and reflected by the reflecting plate 43. The reflecting plate 43 is disposed at a position where the reflected light from the recording layer 511 has a minimum spot. The configuration of the reflecting plate 43 is shown in FIG. 7. The main beam is reflected by a reflecting region 431, while the two sub beams are reflected by reflecting regions 432 and 433. Each reflecting region has a radius of 10 μm, and the distance between the centers of the regions is 130 μm. The reflected light due to the reflecting plate 43 returns to the condenser lens 405 and is converted by the λ/4 plate 106 into linearly polarized light that is polarized perpendicularly to the direction of polarization upon incidence. The linearly polarized light passes through the beam splitter 104. Numeral 406 designates a condenser lens having astigmatic aberration. The photodetector 52 is disposed at the circle of least confusion. The shape of the sensitive portions of the photodetector is as shown in FIG. 5. Signals from the photodetector are processed in the signal processing circuit 53 in order to produce an AF signal and a TR signal for controlling the position of optical spot, and an RF signal, which is a data signal.

Figure 10:
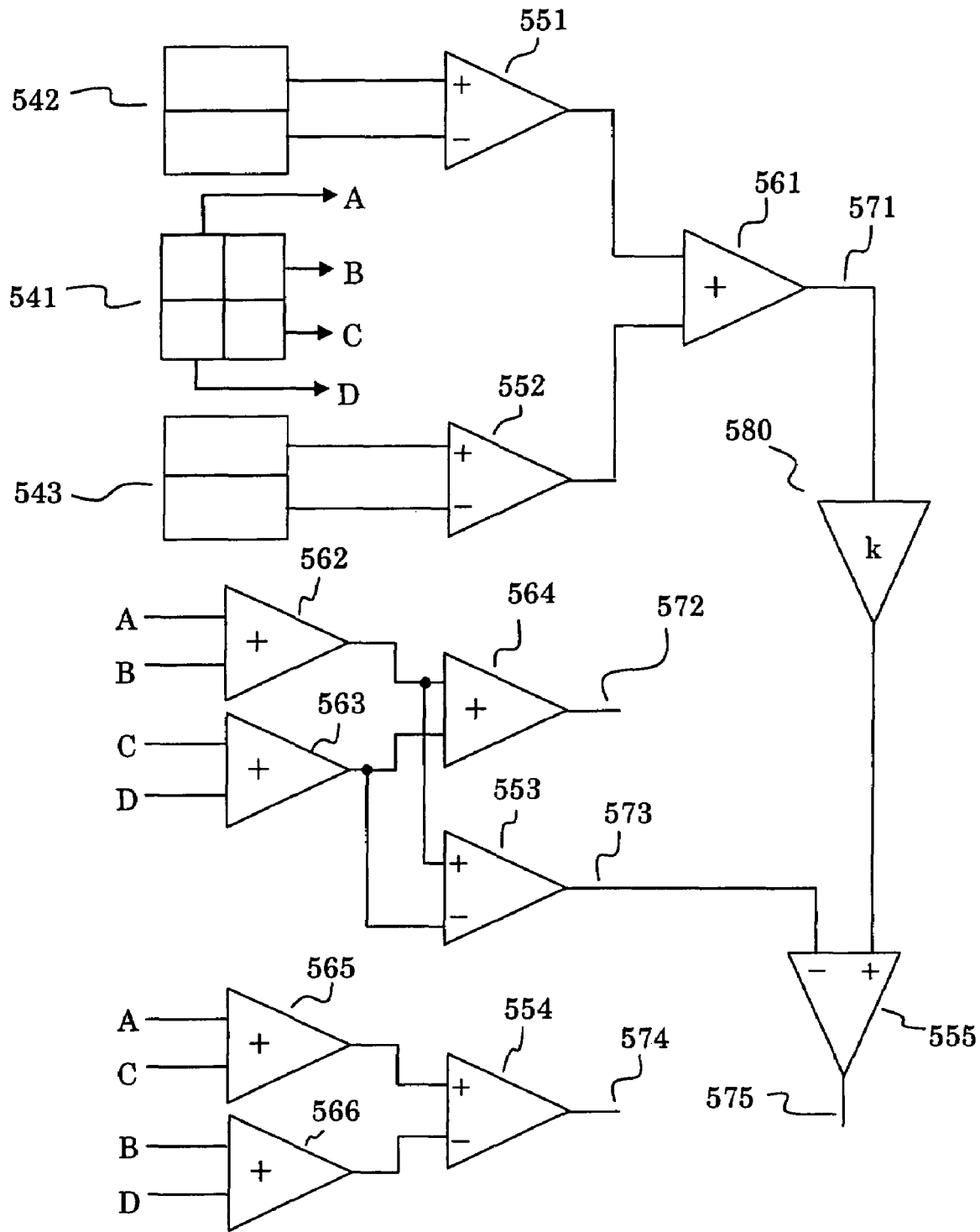
FIG. 10 shows a schematic diagram of a signal processing circuit.

FIG. 10 shows electronic circuits used for signal processing. Photodetectors 541, 542, and 543 are the same as those shown in FIG. 5. The four-quadrant detector 541 detects the main beam, while the split detectors 542 and 543 each detect the sub beam. Numerals 551 to 555 designate differential amplifiers; numerals 561 to 566 designate adding circuits. Numeral 580 designates an amplifier with a factor k, which is determined by the intensity ratio of main beam to sub beam. Signals from the individual detectors are amplified by a preamplifier and then processed by these electronic circuits so as to produce control signals and data signal. Outputs A, B, C, and D from the four-quadrant detector are summed to produce a signal 572, which is the data signal. Numeral 574 designates an AF signal used with an astigmatic aberration method. Numeral 573 designates a push-pull signal obtained from the main beam, while numeral 571 designates a sub push-pull signal obtained from the sub-beams. The signal 571 is amplified by the amplifier 580 by factor k, and is then processed by the differential amplifier 555, together with the push-pull signal 573 due to the main beam, thereby producing a TR signal 575.

Figure 11:
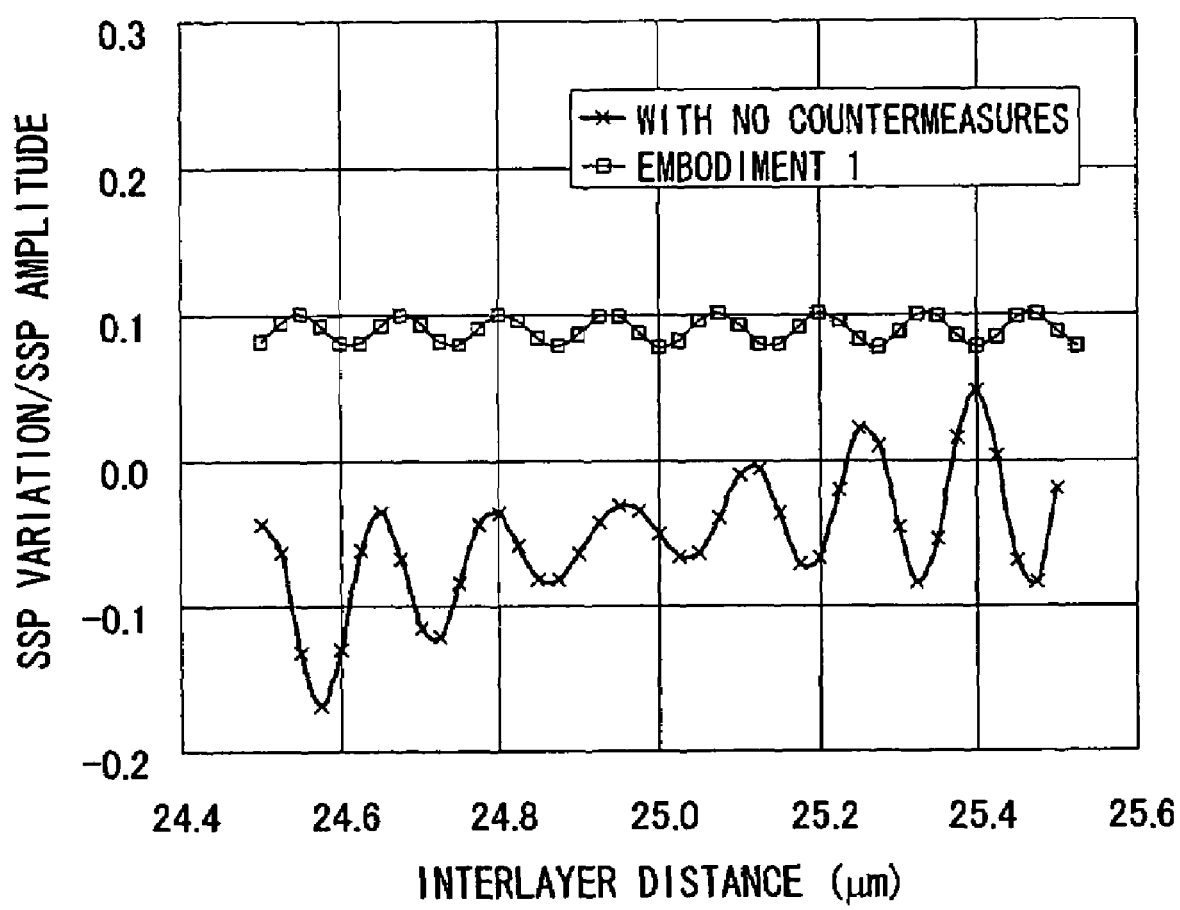
FIG. 11 shows changes in a sub push-pull signal due to changes in the interlayer distance.

FIG. 11 shows an example of computation of the sub push-pull signal (SPP) 571 shown in FIG. 10. The wavelength used is 0.405 μm, NA of the objective lens is 0.85, and the track pitch is 0.32 μm. In the computation, SPP is calculated in consideration of interference of two layers while the interlayer distance is varied, on the assumption that the spot position of the main beam is located on track on the recording layer 511 closer to the objective lens, and that the sub beams are fixed at positions displaced by half track. Since the SPP is not associated with any change in track position, variation in the SPP due to interference effect can be calculated. The horizontal axis of FIG. 11 shows the interlayer distance between two recording layers; the vertical axis shows the SPP signal normalized by the SPP amplitude. The line indicated by squares denotes the SPP signal obtained in Embodiment 1. For comparison, a computed result in a conventional optical system having no reflecting plate 43, namely, an optical system in which photodetectors 541, 542, and 543 are disposed at the position of the reflecting plate 43, is simultaneously shown. It can be seen from this figure that within the illustrated range of interlayer distance, the variation in the SPP signal is 0.024 in Embodiment 1, while it is 0.22 in the conventional optical system in which no countermeasure is taken.

In the present embodiment, the focal length of the condenser lens 405 and that of the lens 406 having astigmatic aberration is both 46 mm. The spot size due to the condenser lens 405 is 4 μm. The astigmatic difference of the lens 406 having astigmatic aberration is 1.7 mm, and the spot size at the circle of least confusion is approximately 30 μm. Because a beam of such small spot size can be reflected by a small reflecting region, the SPP variation can be reduced.

As described above, in accordance with the present invention, it is possible to reduce the phenomenon in which the tracking error signal fluctuates in response to the variations in interlayer distance. When there is interference between the reflected light from the adjacent layer and the sub beam for tracking, their phase difference varies depending on the interlayer distance, resulting in a variation of the sub push-pull signal. In accordance with the invention, however, the influence of the reflected light from the adjacent layer can be reduced, so that the variation in the tracking error signal can be reduced. Thus, it becomes possible to control the laser irradiated position with high accuracy, whereby the laser irradiated position can be accurately determined during read and write and the signal quality can be improved. It also becomes possible to reduce the entry of the reflected light from the adjacent layer into the data signal itself, so that a data signal with reduced error can be obtained.

In the present embodiment a polarizing optical system has been used; however, if there is more than enough semiconductor laser output power, it is possible to use an optical system in which the polarization beam splitter 104 is replaced with a conventional beam splitter and the λ/4 plates 105 and 106 have been removed.

Embodiment 2

Figure 8:
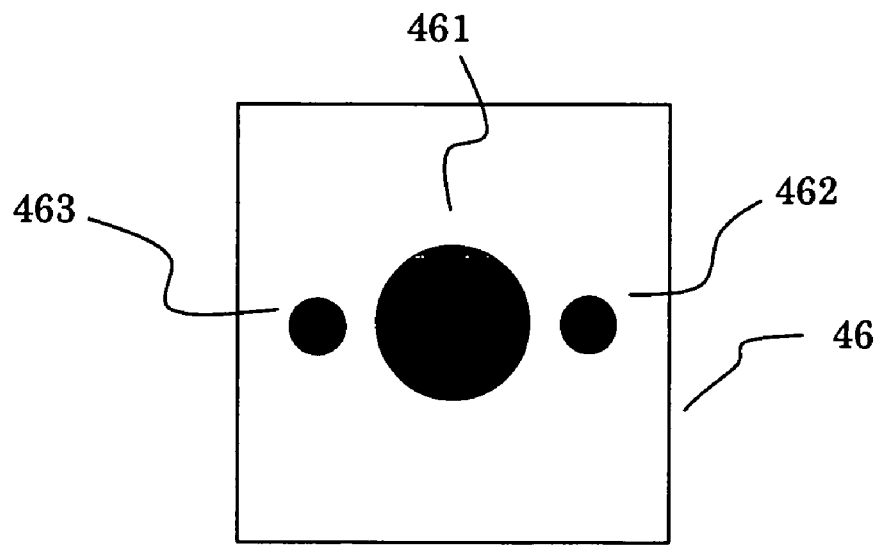
FIG. 8 shows the configuration of a reflecting plate having partial reflecting regions of different sizes.
Figure 12:
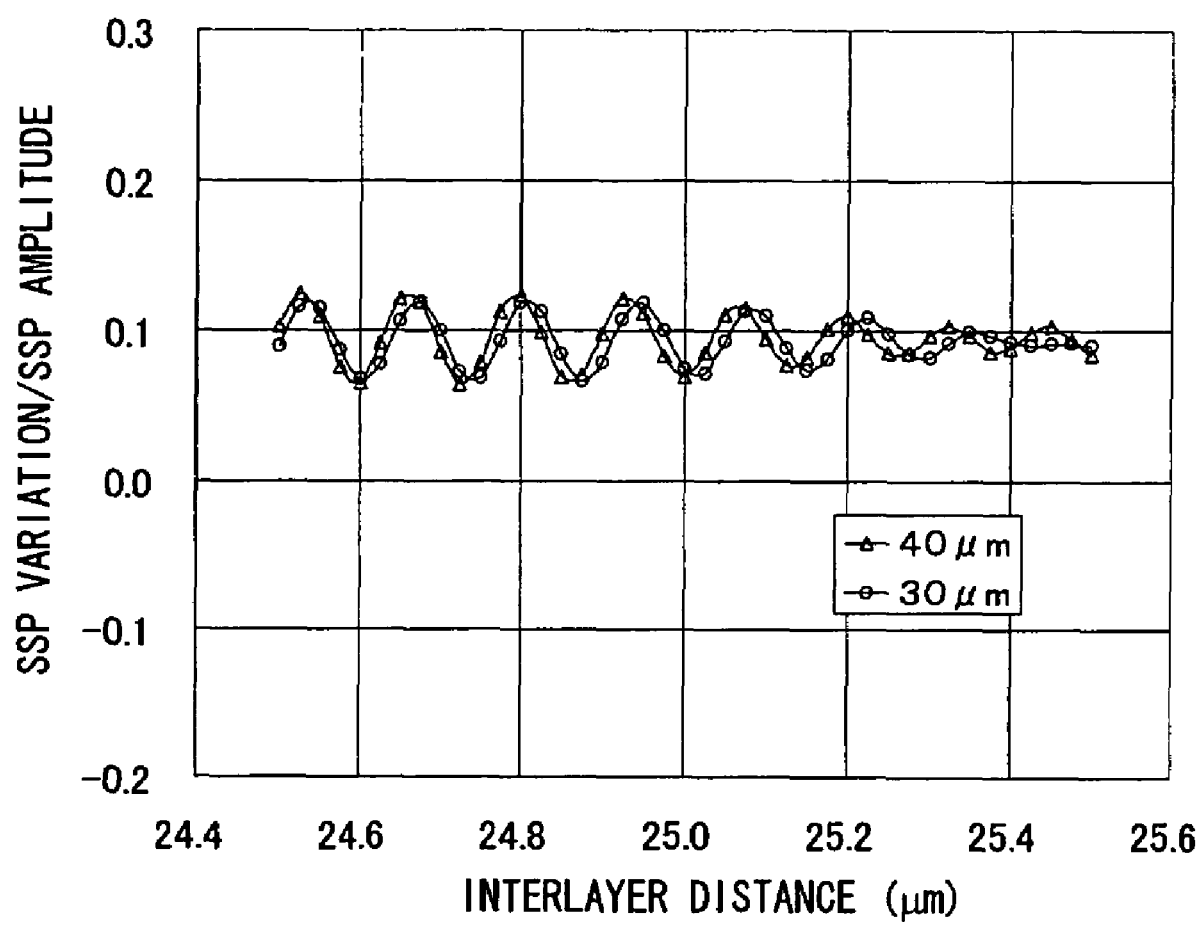
FIG. 12 shows the sub push-pull signal when the size of a central reflecting portion is changed.

In Embodiment 1 the reflecting plate 43 had reflecting regions of the same size for the main beam and the sub beams. However, there are cases where the lock-on range of focus is not per design. In order to deal with such cases, in Embodiment 2, the size of the region reflecting the main beam and that of the region reflecting the sub beams are made different. FIG. 8 shows an example in which at the position of the reflecting plate 43 in FIG. 1, a substitute reflecting plate is disposed. A reflecting portion 461 of the reflecting plate 46 is for the main beam, and reflecting portions 462 and 463 are for the sub beams. FIG. 12 shows an example of computation of the sub push-pull signal (SPP) 571 of FIG. 10 when the reflecting plate is used. The radius of the reflecting regions 462 and 463 is 10 μm, and the radius of the region 461 is set to be 30 μm or 40 μm. Other parameters are the same as in Embodiment 1; namely, the center-to-center interval of the reflecting portions is 130 μm, the wavelength used is 0.405 μm, the NA of the objective lens is 0.85, and the track pitch is 0.32 μm. The horizontal axis of FIG. 12 shows the interlayer distance between two recording layers; the vertical axis shows the SPP signal normalized by the SPP amplitude. The triangles show an SPP signal of the central reflecting portion having the radius of 40 μm, while the circles show an SPP signal when the radius is 30 μm. It can be seen from this drawing that the SPP variation in the case of radius 40 μm is 0.061, while that in the case of radius 30 μm is 0.053. As shown in FIG. 11, the SPP variation in the absence of countermeasures is 0.21; thus, the SPP variation is reduced, thus demonstrating the effect of the invention.

Figure 13:
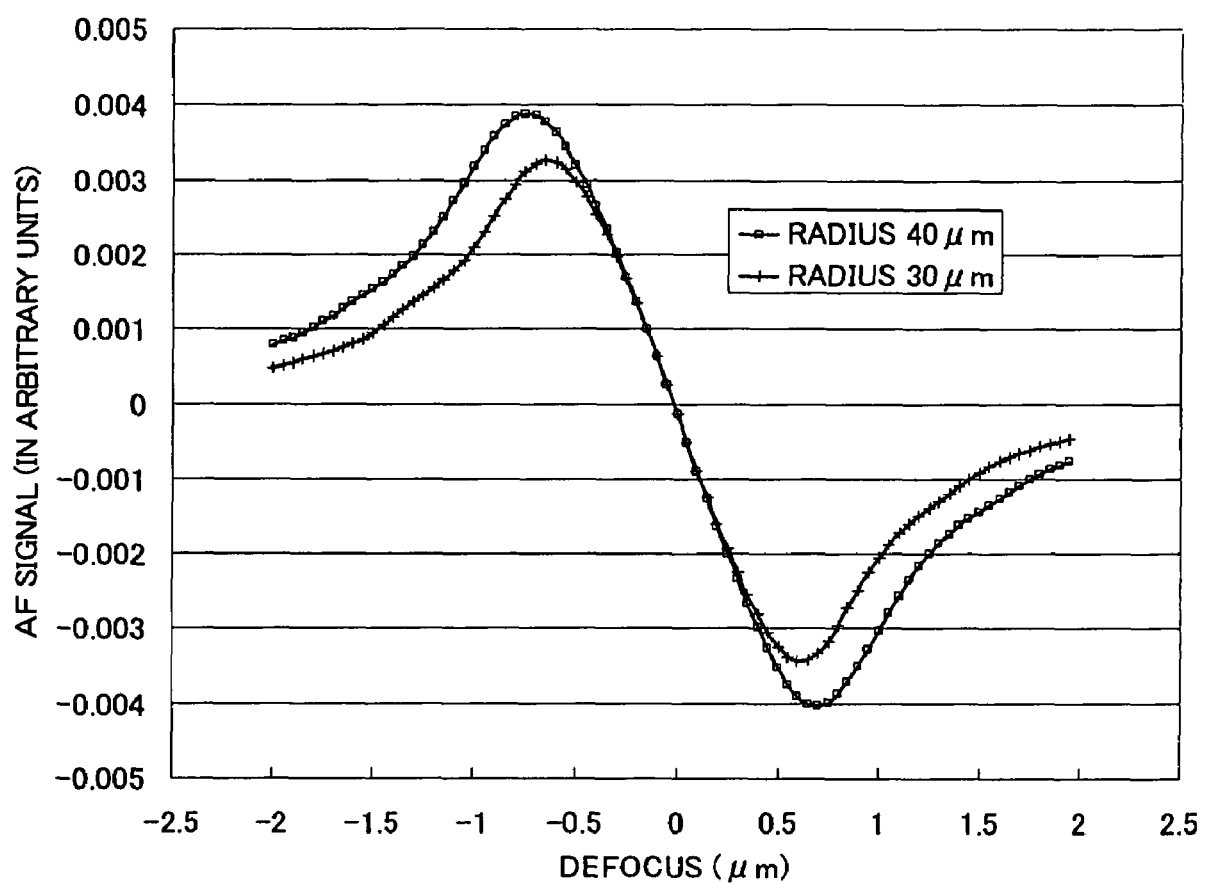
FIG. 13 shows an AF signal when the size of a central reflecting portion is changed.

FIG. 13 shows changes in the AF signal 574 when the optical disc is shifted along the optical axis. The horizontal axis shows the defocusing amount. When there is zero defocus, the recording surface of the optical disc and the position of the minimum spot of laser light coincide with each other. When the radius of the reflecting portion 461 is 30 μm, the lock-on range is 1.25 μm; when the radius is 40 μm, it is 1.45 μm. As the radius increases, the lock-on range becomes wider.

Figure 9:
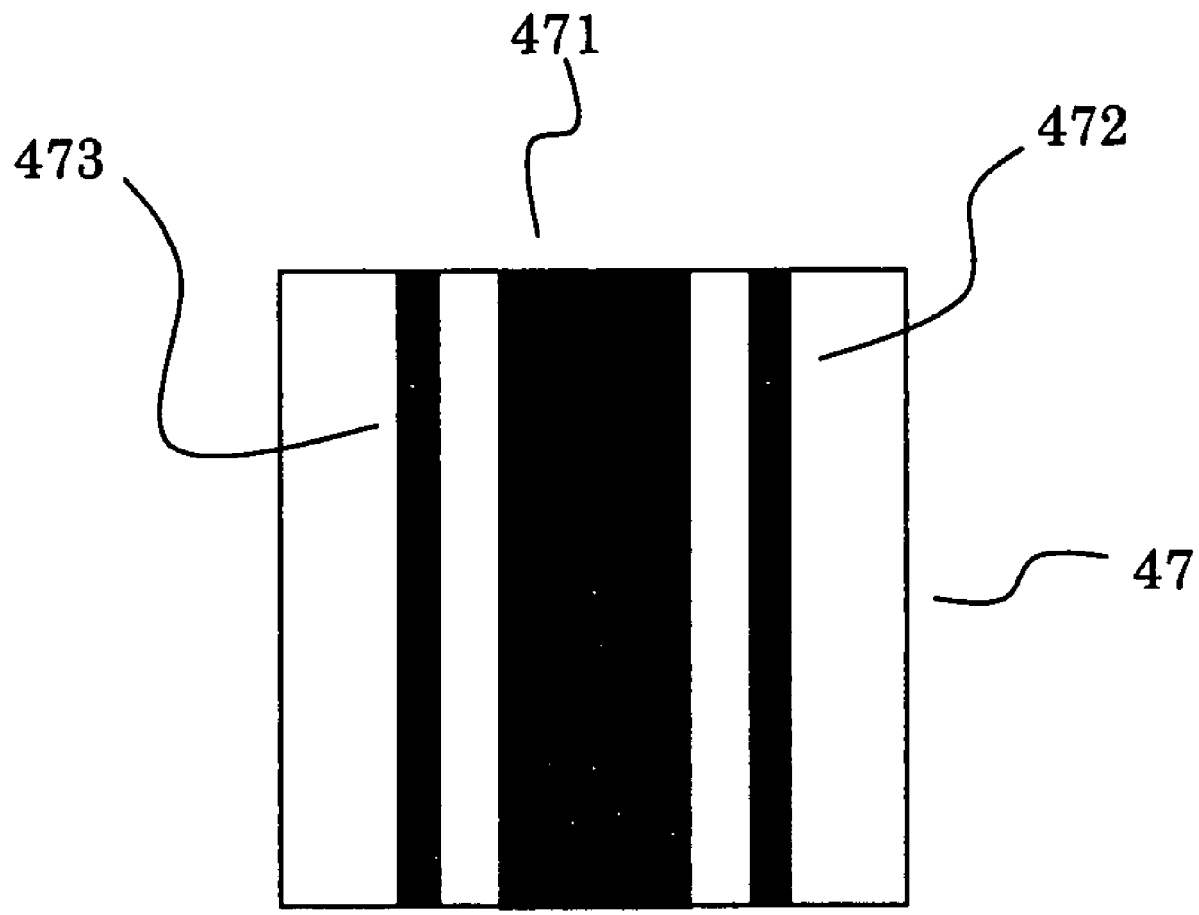
FIG. 9 shows the configuration of a reflecting plate having striped partial reflecting regions.

It is also possible to reduce the influence of the reflected light from the adjacent layer by employing a reflecting plate shown in FIG. 9, which has striped reflecting regions, at the position of the reflecting plate 43 of FIG. 1. A reflecting region 471 reflects the main beam, while regions 472 and 473 reflect the sub beams. It is also possible to set the stripes not just perpendicular to but at an angle with respect to the line connecting the centers of the main beam and the two sub beams. In such case, an advantage can be obtained that the position of the reflecting plate having the striped reflecting regions can be readily adjusted relative to the three beams by merely moving it in the horizontal direction.

Embodiment 3

Figure 2:
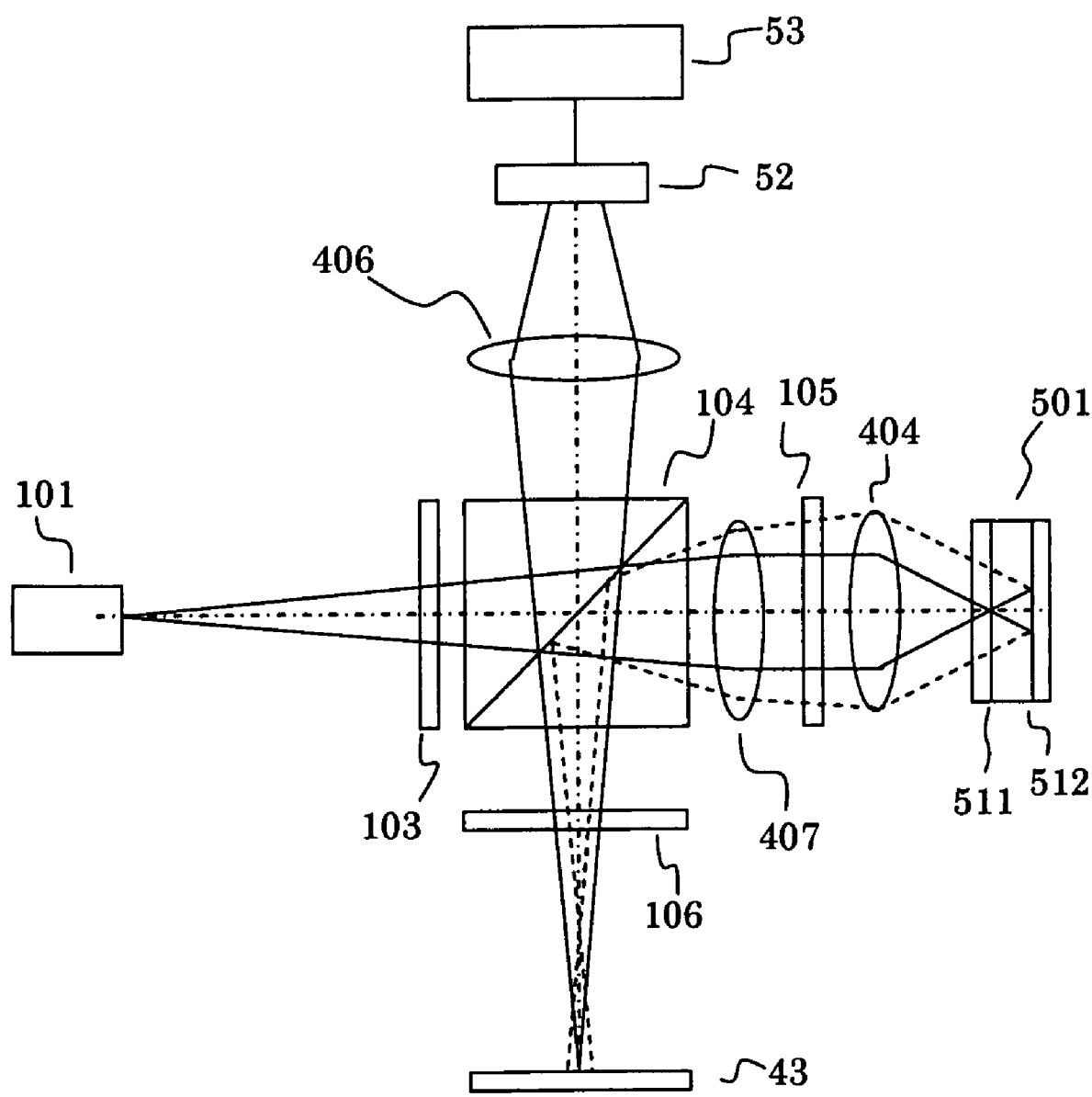
FIG. 2 shows an example of an optical system in the optical pickup apparatus according to the invention.
Figure 3:
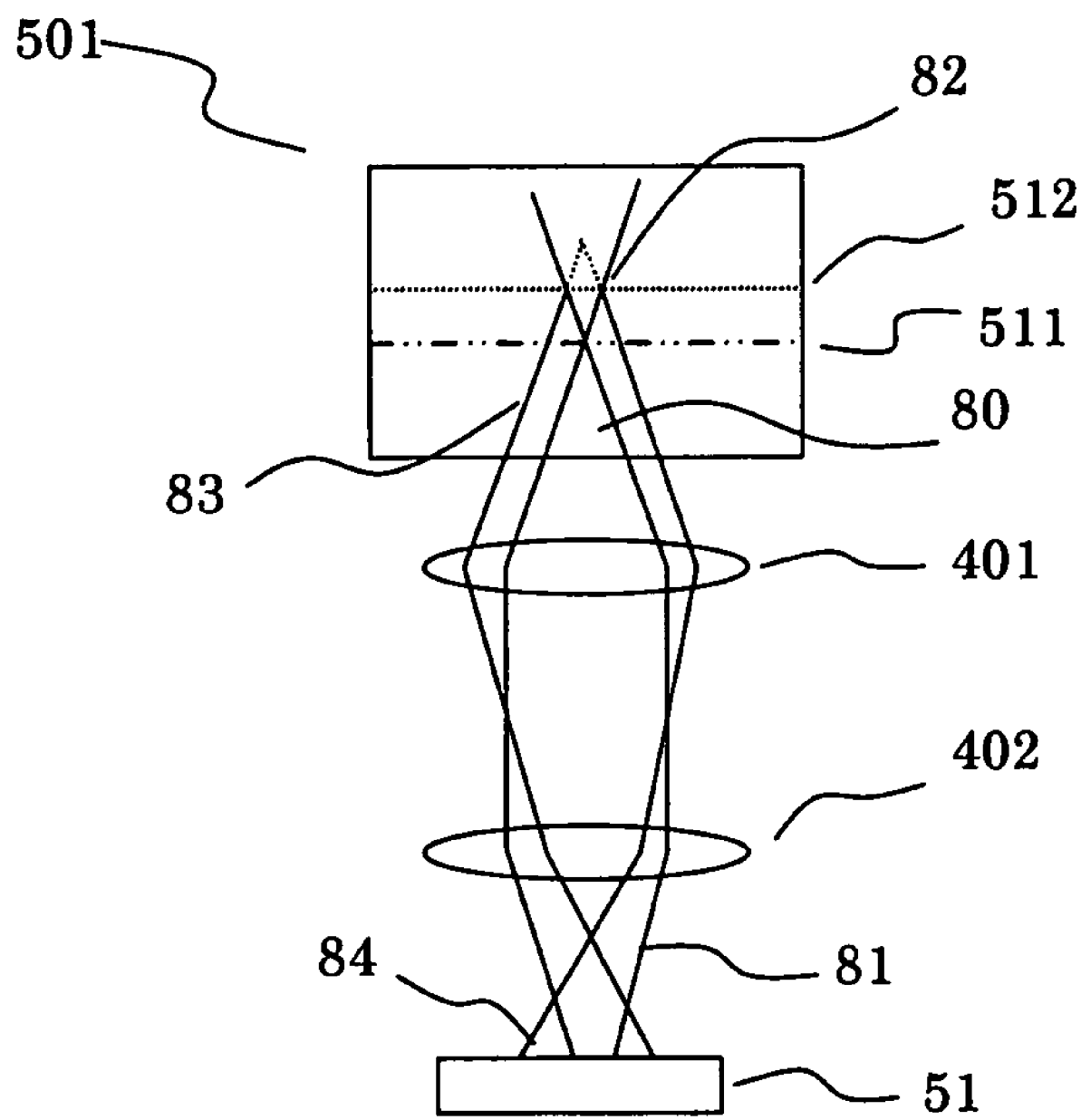
FIG. 3 shows the influence of the reflected light from an adjacent layer.
Figure 4:
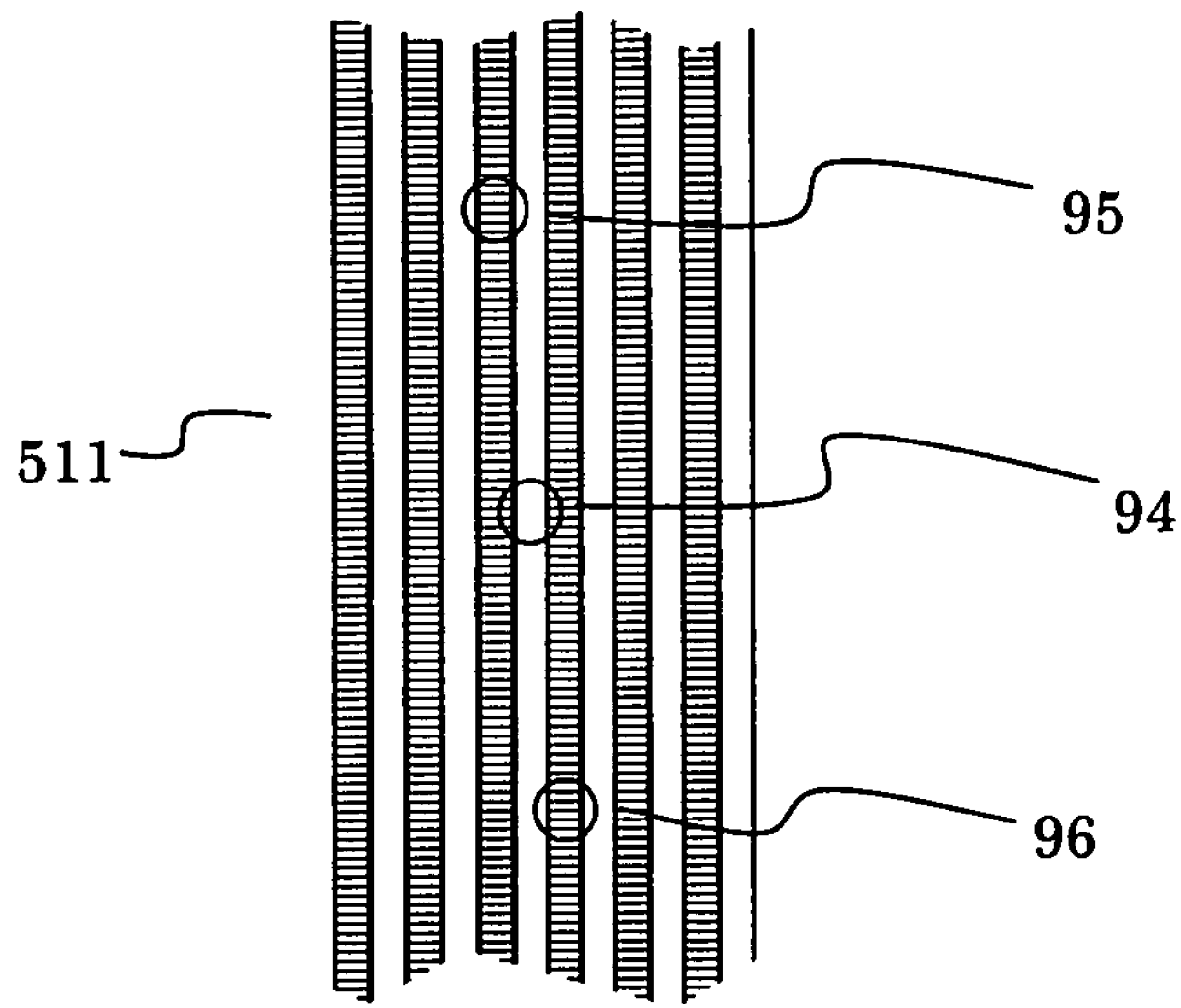
FIG. 4 shows a grooved recoding surface being irradiated with one main beam and two sub beams.

In Embodiment 3 shown in FIG. 2, the diffraction grating 103 and the polarization beam splitter 104 are disposed more toward the semiconductor laser 101 than toward the collimating lens 407. Thus, the laser light emitted by the semiconductor laser 101 passes through the polarization beam splitter 104 as a diverging ray. The diverging ray is thereafter converted by the collimating lens 407 into a collimated optical beam, which then becomes incident on the diffraction grating 105. In Embodiment 1, because the diffraction grating 103 and the polarization beam splitter 104 are disposed between the collimating lens 403 and the objective lens 404, the condenser lens 405 is required; in Embodiment 3, because the optical beam reflected by the target layer 511 of the multilayer disc 501 is converted into a converging ray once it passes through the collimating lens 407, as shown in FIG. 2, the need for a condenser lens is eliminated and so the number of components can be reduced.

Embodiment 4

Figure 14:
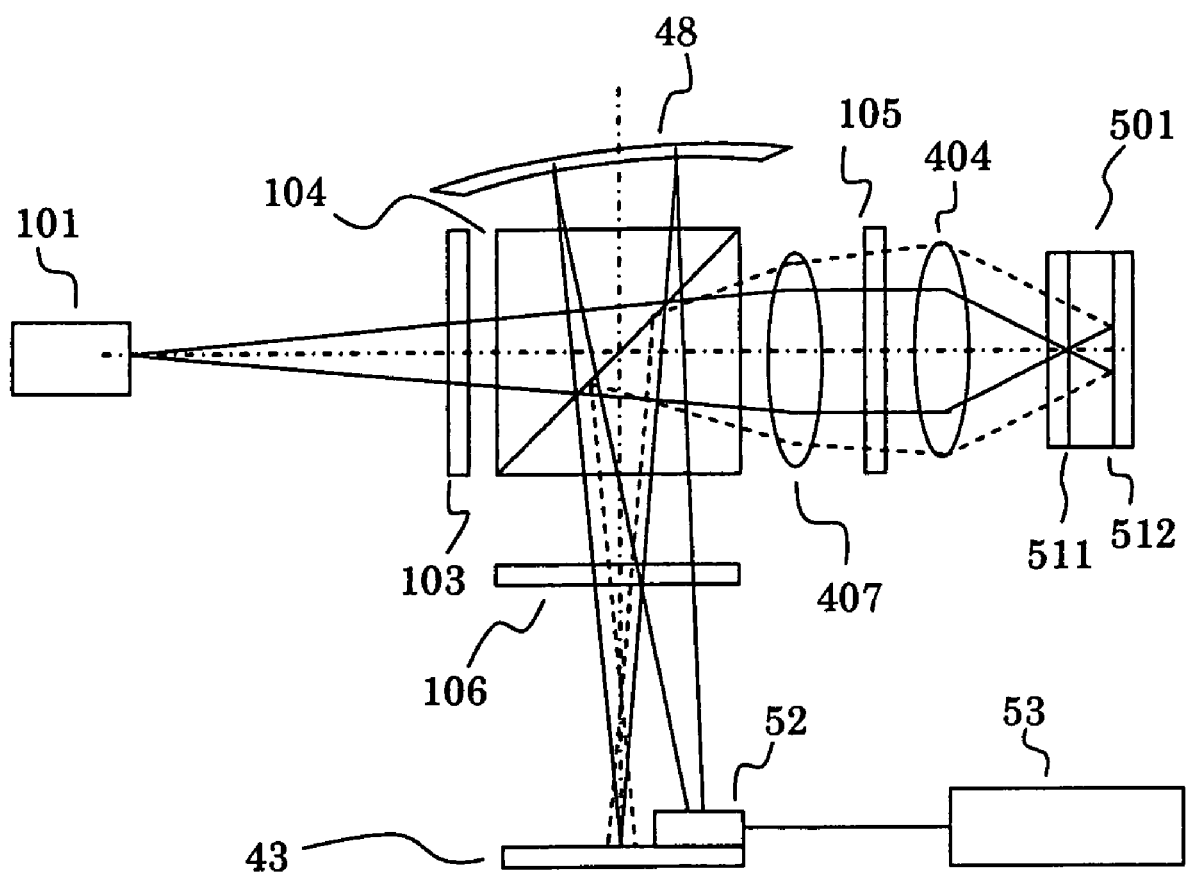
FIG. 14 shows an example of an optical system of the optical pickup apparatus according to the invention.

FIG. 14 shows a fourth embodiment, in which the reflected light from the optical disc 501 is reflected by the polarization beam splitter 104 and is then transmitted by the λ/4 plate 106, resulting in circularly polarized light, which is reflected by the reflecting plate 43. On the reflecting plate 43, a photodetector 52 is disposed off the optical axis. The photodetector, however, is not used for the direct detection of the reflected light from the optical disc that has been reflected by the polarization beam splitter 104. As the light reflected by reflecting plate 43 having partial reflecting regions passes through the λ/4 plate, its polarization direction is changed by 90 degrees relative to its original direction upon incidence, resulting in the light passing through the polarization beam splitter 104 and being reflected by a concave mirror 48. The optical axis of the concave mirror is directed toward the photodetector 52, so that the reflected light is detected by the photodetector 52. In order to obtain an AF signal by an astigmatic aberration method, the concave mirror 48 is provided with astigmatic aberration. The signal produced by the photodetector 52 upon detection of light is processed by the signal processing circuit 53 in order to form AF signal and TR signal by which the optical spot position is controlled, and RF signal, which is a data signal. In the present embodiment, the use of the concave mirror 48 allows the optical path to the photodetector to be shared with the optical path to the reflecting plate 43, thereby allowing the photodetector to be placed on the reflecting plate 43. Thus, the portion of the optical system above the polarization beam splitter 104 can be eliminated, thereby contributing to the reduction of the size of the apparatus.

Embodiment 5

Figure 15:
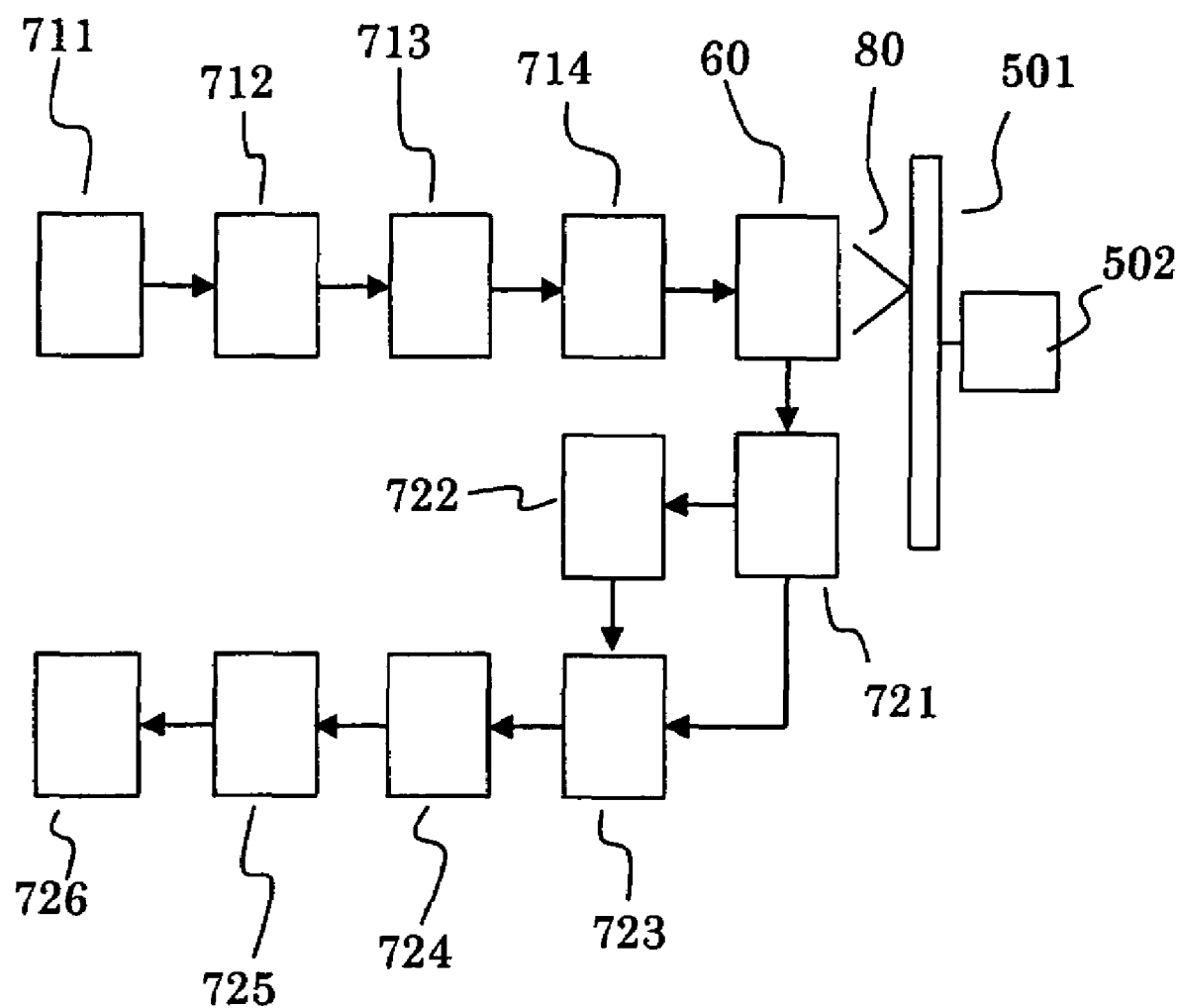
FIG. 15 shows a schematic diagram of an optical disc drive apparatus according to the invention.

FIG. 15 shows an embodiment of the optical disc drive apparatus whereby the variation in SPP can be reduced. Circuits 711 to 714 are used for recording data in the multilayer optical disc 501. Numeral 711 designates an encoding circuit for error correction by which an error correction code is added to data. Numeral 712 designates a record encoding circuit by which data is modulated by the 1-7PP method. Numeral 713 designates a record compensating circuit, which generates a write pulse adapted to a mark length. Based on a pulse sequence generated, a semiconductor laser drive circuit 714 drives a semiconductor laser within an optical pickup 60 so as to modulate laser light 80 emerging from the objective lens. On the optical disc 501 rotated by a motor 502, a phase-change membrane is formed, which becomes amorphous when heated with laser light and then quenched, and which becomes crystalline when slowly cooled. These two states have different reflectivities, allowing the formation of a mark. In a write state, no high-frequency superposition, which decreases the coherency of laser light, is performed. Therefore, the reflected light from the adjacent layer and the reflected light from the relevant layer easily interference with each other. As a result, if no measure to reduce the SPP variation is taken, problems would occur, such as tracking error or deletion of data of an adjacent track, for example. In the present embodiment, the optical pickup 60 is comprised of any of the optical pickups according to Embodiments 1 to 4, so that there are no tracking problems in the multilayer disc.

Circuits 721 to 726 are used for reading data. Numeral 721 designates an equalizer for improving the S/N ratio in the vicinity of a minimum mark length. A signal from this circuit is fed to a PLL circuit 722 where the clock is extracted. A data signal processed by the equalizer is digitized by an A-D converter 723 in synchronism with the extracted clock. Numeral 724 designates a PRML (Partial Response Maximum Likelihood) signal processing circuit, which carries out Viterbi decoding. In a record decoding circuit 725, decoding is carried out in accordance with the modulation rules of the 1-7PP method, and the data is restored in an error correcting circuit 726.

INDUSTRIAL APPLICABILITY

In accordance with the present invention, the influence of the reflected light from the adjacent layer can be reduced when reading a multilayer optical disc in an optical disc drive apparatus. When reading from or writing into a multilayer optical disc, it is necessary to control the tracking position of laser light on the optical disc accurately using an error signal. If there is reflected light from an adjacent layer, an error could be introduced into the tracking position due to the shifting of an error signal caused by interference effect. This makes it impossible to read data signal accurately or determine the write position accurately. In accordance with the invention, such problems can be eliminated. Further, the invention helps to reduce cross talk due to the entry of the reflected light from the adjacent layer into the data signal itself, thereby improving the quality of data signal.

What is claimed is:

1. An optical pickup apparatus, comprising:
 a laser light source;
 a condensing optical system for dividing laser light from the laser light source into a main beam and a sub beam, and condensing the main beam and the sub beam at a recording layer on a multilayer optical information storage medium; and
 a detection optical system for detecting reflected light reflected by the recording layer on the multilayer optical information storage medium,
 wherein the detection optical system comprises:
 an optical system for narrowing the reflected light from the recording layer;
 a reflecting plate having reflecting regions which are independently disposed at spot positions of the main beam and the sub beam narrowed by the optical system;
 an astigmatic aberration-containing condensing element; and
 a photodetector having a detector element for detecting the main beam and another detecting element for detecting the sub beam,
 wherein the reflected light reflected by the reflecting plate is condensed by the astigmatic aberration-containing condensing element on the photodetector where it is detected.

2. The optical pickup apparatus according to claim 1, wherein a beam splitter is disposed in the optical path of the condensing optical system, the condensing optical system and the detection optical system sharing the optical path between the beam splitter and the recording layer.

3. The optical pickup apparatus according to claim 2, wherein the area of the reflecting region corresponding to the main beam and the area of the reflecting region corresponding to the sub beam are different.

4. The optical pickup apparatus according to claim 2, wherein the reflecting regions provided in the reflecting plate are striped.

5. The optical pickup apparatus according to claim 4, wherein the width of the stripe of the reflecting region corresponding to the main beam and the width of the stripe of the reflecting region corresponding to the sub beam are different.

6. The optical pickup apparatus according to claim 2, wherein the astigmatic aberration-containing condensing element comprises a condenser lens, and wherein the reflecting plate and the astigmatic aberration-containing condensing element are disposed with the beam splitter disposed between them.

7. The optical pickup apparatus according to claim 2, wherein the astigmatic aberration-containing condensing element comprises a concave mirror, and wherein the reflecting plate and the astigmatic aberration-containing condensing element are disposed on the same side with respect to the beam splitter.

8. The optical pickup apparatus according to claim 2, wherein the condensing optical system causes the laser light from the laser light source to pass through the beam splitter as a diverging ray.

9. The optical pickup apparatus according to claim 2, wherein the beam splitter comprises a polarization beam splitter.

10. An optical disc drive apparatus comprising:
 a medium drive unit for carrying and rotating a multilayer optical information storage medium;
 an optical pickup apparatus having a signal processing optical system for irradiating the multilayer optical information storage medium carried on the medium drive unit with laser light, and detecting recorded information; and a signal processing circuit for obtaining, from the signal detected by the signal processing optical system in the optical pickup apparatus, a focus position control signal, a tracking position control signal, and a data signal, wherein the signal processing optical system comprises:

a laser light source;

a condensing optical system for dividing the laser light from the laser light source into a main beam and a sub beam, and condensing the main beam and the sub beam at a recording layer of the multilayer optical information storage medium; and a detection optical system for detecting reflected light reflected by the recording layer, wherein the detection optical system comprises:

an optical system for narrowing the reflected light from the recording layer;

a reflecting plate having reflecting regions which are independently disposed at spot positions of the main beam and the sub beam narrowed by the optical system;

an astigmatic aberration-containing condensing element; and a photodetector having a detector element for detecting the main beam and another detecting element for detecting the sub beam, wherein the reflected light reflected by the reflecting plate is condensed by the astigmatic aberration-containing condensing element on the photodetector where it is detected.

11. The optical disc drive apparatus according to claim 10, wherein a beam splitter is disposed in the optical path of the condensing optical system, the condensing optical system and the detection optical system sharing the optical path between the beam splitter and the recording layer.

12. The optical disc drive apparatus according to claim 11, wherein the area of the reflecting region corresponding to the main beam and the area of the reflecting region corresponding to the sub beam are different.

13. The optical disc drive apparatus according to claim 11, wherein the reflecting regions provided in the reflecting plate are striped.

14. The optical disc drive apparatus according to claim 13, wherein the width of the stripe of the reflecting region corresponding to the main beam and the width of the stripe of the reflecting region corresponding to the sub beam are different.

15. The optical disc drive apparatus according to claim 11, wherein the astigmatic aberration-containing condensing element comprises a condenser lens, and wherein the reflecting plate and the astigmatic aberration-containing condensing element are disposed with the beam splitter disposed between them.

16. The optical disc drive apparatus according to claim 11, wherein the astigmatic aberration-containing condensing element comprises a concave mirror, wherein the reflecting plate and the astigmatic aberration-containing condensing element are disposed on the same side with respect to the beam splitter.

17. The optical disc drive apparatus according to claim 11, wherein the condensing optical system causes the laser light from the laser light source to pass through the beam splitter as a diverging ray.

18. The optical disc drive apparatus according to claim 11, wherein the beam splitter comprises a polarization beam splitter.

* * * * *